(12) United States Patent
Gomez Ruiz

(10) Patent No.: US 7,460,751 B2
(45) Date of Patent: Dec. 2, 2008

(54) LIGHTING OR SIGNALLING DEVICE HAVING AN OPTICAL GUIDE FOR A MOTOR VEHICLE

(75) Inventor: Carlos Gomez Ruiz, Jaen (ES)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 11/761,039

(22) Filed: Jun. 11, 2007

(65) Prior Publication Data

US 2007/0292101 A1      Dec. 20, 2007

(30) Foreign Application Priority Data

Jun. 15, 2006      (FR) .................................. 06 05361

(51) Int. Cl.
G02B 6/00      (2006.01)
G02B 6/26      (2006.01)
F21V 9/00      (2006.01)

(52) U.S. Cl. ......................... 385/39; 385/147; 385/901; 362/26; 362/509; 362/511; 362/551; 362/559

(58) Field of Classification Search ................... 385/39, 385/147, 901; 362/26, 509, 511, 551, 559
See application file for complete search history.

(56) References Cited

U.S. PATENT DOCUMENTS 6,036,340 A      3/2000   Fohl et al.
6,880,945 B2     4/2005   Knaack et al.
7,025,482 B2 *   4/2006   Yamashita et al. .......... 362/511
2003/0026106 A1  2/2003   Knaack et al.

FOREIGN PATENT DOCUMENTS

| EP | 0940625 A2  | 9/1999 |
| FR | 2828267 A3  | 2/2003 |
| FR | 2833688 A1  | 6/2003 |
| WO | 2006128422 A1 | 12/2006 |

* cited by examiner

*Primary Examiner*—Frank G Font
*Assistant Examiner*—Michael P Mooney
(74) *Attorney, Agent, or Firm*—Jacox, Meckstroth & Jenkins

(57) ABSTRACT

A lighting and/or signalling device, in particular for a motor vehicle, comprising at least one light source emitting light rays and at least one optical guide in which the light beam spreads, the at least one optical guide comprising at at least one of its ends an input face coupling the at least one optical guide and the at least one light source, a first surface forming an output face for the light beam, and a second surface, in particular remote from the output face, forming a face for reflection of the light rays, such that the at least one optical guide has at least one bend, the at least one optical guide in the region of the at least one bend having at least one corner protruding toward the outside of the at least one bend and bevelled by having two facets in order to send back the incident rays into the at least one optical guide.

20 Claims, 3 Drawing Sheets

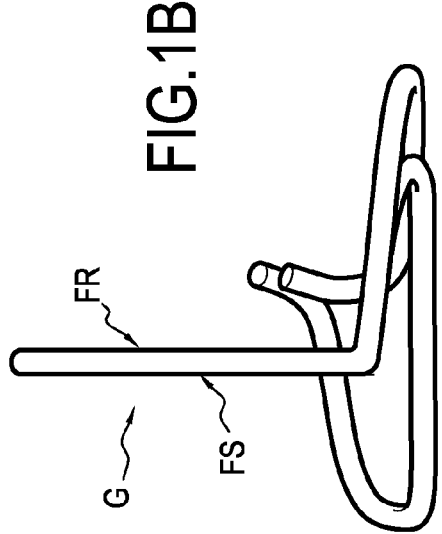
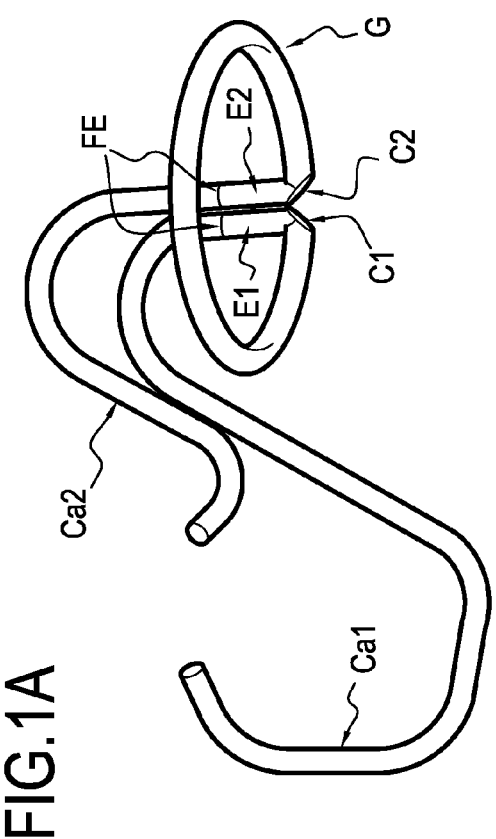
FIG.1A
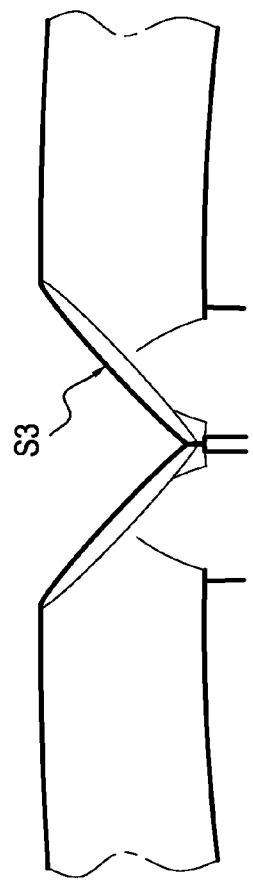
FIG.1B
FIG.6
PRIOR ART

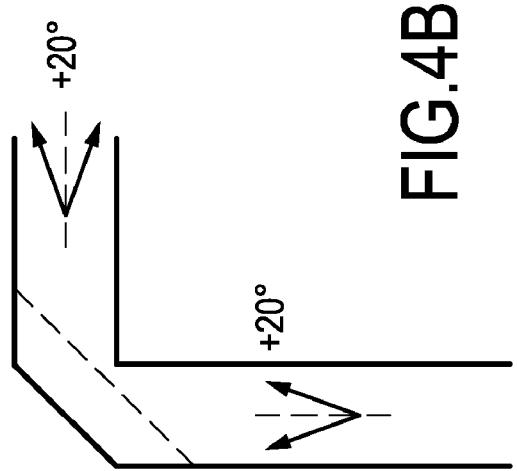
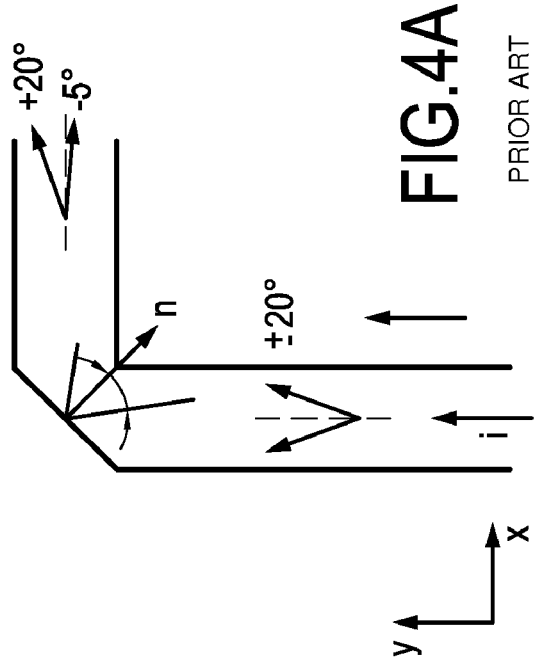

LIGHTING OR SIGNALLING DEVICE HAVING AN OPTICAL GUIDE FOR A MOTOR VEHICLE

BACKGROUND OF THE INVENTION

1. Field of the Invention

The present invention relates to a lighting and/or signalling device, in particular intended to be fitted to a motor vehicle, comprising at least one optical guide capable of diffusing light over at least a portion of its length. The invention also relates to a vehicle comprising a lighting or signalling device of this type.

2. Description of the Related Art

In the field of motor vehicle lighting and signalling, the use of optical guides is becoming increasingly common. An optical guide is, highly schematically, an elongate element made of transparent material, generally of cylindrical or similar cross section. In proximity to one of the ends of the guide, referred to as the input face of the guide, is arranged one (or more) light sources, for example a small, light-emitting diode-type light source: the light rays emitted by this source spread by total reflection over the length of the guide toward its opposing end, referred to as the terminal face of the guide. A portion of the light rays spreading into the guide issues through the face known as the front face of the guide owing to the presence of reflective elements arranged on the face known as the rear face of the guide, remote from the preceding face. These reflective elements consist, for example, of prisms. The guide thus emits light over its entire length. It has the advantage of being able to assume very varied geometric shapes, of being rectilinear or curved, and of conveying a lighting surface even into inaccessible zones of the headlamp or light of the vehicle. It thus makes an important contribution to the style of the headlamp or light.

These guides have to meet numerous requirements:

They have to be supply light into zones of the vehicle light or headlamp that may be inaccessible, and this in some cases necessitates the design of systems for conveying light to the input of the guide—the light source, for its part, being offset and remote from the guide.

These guides often assume complex shapes, with bends for example, and this often leads to undesirable leakages of light in the region of these bends, and therefore to reduced lighting power of the guide downstream of the bend (the terms "upstream" and "downstream" being understood as a function of the general direction in which the light spreads into the guide).

The zone for coupling between the light emitted by the light source (directly or via a light conveying element such as a fiber optic) and the guide is also awkward to design, as misdirected light has to be prevented from escaping at an untimely moment out of the guide or from failing completely to return therein. This problem is encountered, in particular, in guides having a closed or almost closed contour, in which there is observed, when the guide is switched on, a high-intensity light point emitted by the coupling zone (light point also referred to as a hot spot), thus reducing the light output of the guide over the entire length thereof and providing the guide with an unattractive, non-uniform appearance.

There is, for example, known from the application for utility model FR 2 828 267 an annular-type light guide: the light flux passing into the guide is divided in two and issues in opposing directions into the annular guide by way of an injection element conveying the light perpendicularly to the plane of the ring. This injection element is associated with an injection surface comprising two surfaces diverting the light, so that it is reflected toward the guide in order to spread at this location. This light injection system is capable of improvement, as it still generates leakages of light: the guide still has in the region of this injection surface a hot spot which is detrimental to the appearance of the guide.

There is, therefore, a need to provide a system and method that overcomes one or more problems in the prior art.

SUMMARY OF THE INVENTION

The object of the invention is therefore to improve the design of optical guides or light guides sometimes referred to herein as guides. The invention seeks, in particular, to improve the light output of the guides by limiting undesirable leakages of light and/or to improve the uniformity of appearance of the guides when switched on, in particular by preventing the formation of "hot spots" as specified hereinbefore.

The invention relates firstly to a lighting and/or signalling device, in particular for a motor vehicle, comprising at least one light source emitting light rays or light beams and at least one optical guide in which the light beam spreads (propagates), the at least one optical guide having

- at at least one of its ends an input face coupling the at least one optical guide and the light source,
- a first surface forming an output face for the light beam, and
- a second surface, in particular remote from (opposite to) the output face, forming a face for reflection of the light rays, such that the at least one optical guide has at least one bend, the at least one optical guide in the region of the at least one bend having at least one corner protruding toward the outside of the at least one bend and bevelled by having two facets in order to send back the incident rays into the at least one optical guide.

The term "bend" refers, in the context of the invention, to a change in the general direction of the guide without entailing any limitation specifically to a 90° bend.

Advantageously, the protruding corner is designed so as to cause two reflections successively onto one then the other of the facets under conditions for total reflection of the incident light rays.

This configuration is highly advantageous: it was known to cause rays to deviate into a guide by way of a surface inclined over the outer portion of the bend in an appropriate manner for the incident rays to be reflected at this location by total reflection and to be sent back into the guide. However, a significant amount of light is lost with this type of "single" reflection bend, as a portion of the light arrives on this inclined surface at an angle of incidence smaller than that allowing total reflection: the light, instead of being sent back, continues on its path by passing through the inclined surface. The invention, on the other hand, proposes a bend with two inclined surfaces facing each other, so as to cause double total reflection: the incident rays reach the first facet, then are sent back toward the second which sends them back into the "downstream" portion of the guide beyond the bend. In this configuration, the incident rays are still, or are for the most part, under the angular conditions of total reflection, and leakages of light are reduced to a minimum or even completely eliminated.

According to a first embodiment, the bend is not located in proximity to the input face of the guide. Its presence is required, for example, for visual or technical reasons, or for considerations of overall size in the light or the headlamp.

According to a second embodiment, the bend is located in proximity to the input face or to at least one of the input faces of the optical guide. Its presence is generally necessitated by a light injection point in the form of an end piece positioned, for example, obliquely or perpendicularly to the plane of the guide itself: the bend allows the light to be caused to deviate from the general direction which it took in the end piece toward the general direction of spread which it has to have in the guide which it powers.

According to an example, the guide has an almost closed contour, with two input faces (on each of its ends) arranged in proximity to each other.

According to another example, the guide has a completely closed contour, with a single input face. In this case, the input face is preferably on a light conveying end piece so that the light rays spreading into the end piece are then distributed in the region of the zone for connection of the guide to the end piece in two streams issuing into the guide in differing directions. There can then be obtained two bends in the region of the zone for connection of the guide to the end piece, the bends being joined and their protruding corners partially intersecting.

As mentioned hereinbefore, the input face or each of the input faces of the guide may be on a light conveying end piece, the sole purpose of which is to conduct the light toward the guide. According to either example, in particular, the bend provided with the protruding corner may be arranged in the zone for connection of the guide to the end piece.

Advantageously, the end piece or pieces is/are an integral part of the optical guide: the entire configuration can be molded in one piece, preferably made of transparent polymer material, although glass material is also possible. The invention also relates to any motor vehicle incorporating a light guide of this type.

These and other objects and advantages of the invention will be apparent from the following description, the accompanying drawings and the appended claims.

BRIEF DESCRIPTION OF THE DRAWINGS

The invention will be described in detail with reference to a plurality of non-limiting embodiments illustrated by the following figures, in which:

FIGS. 1A and 1B are two views of a first example of an optical guide and its conveyance of light according to the invention;

FIGS. 4A and 4B compare the path of the light rays into a light guide with a bend according to the invention (FIG. 4B) and according to the prior art (FIG. 4A);

FIGS. 5A and 5B are tables of data relating to the optical performance levels of the bent guides according to FIGS. 4A and 4B; and FIG. 6 is a detailed view of a zone for the injection of light into an optical guide according to the prior art.

All of these figures are highly schematic and are, for the sake of clarity, not necessarily true to scale.

DESCRIPTION OF THE PREFERRED EMBODIMENTS

FIGS. 1A and 1B show a first example of an optical guide G viewed in profile (FIG. 1B) and viewed in perspective (FIG. 1A). This guide G has a generally annular shape allowing it to be arranged around an optical module of the dipped or full-beam module type for a vehicle headlamp. This guide can perform signalling functions such as a position light or daytime running light function. In this case, the guide has a rear face known as the reflection face FR (FIG. 1B) provided with prisms, in a known manner, and a front face known as the output face FS which is generally cylindrical or toric in shape. The rays spread into the guide, with total reflection onto the prisms of the reflection face FR, issue over the entire periphery of the guide defined by the output face in order to provide the desired lighting. The section of the guide is in this case, by way of example, circular.

The guide has two light injection points, in the form of two end pieces (E1, E2), the end of which defines a light input face (FE). These end pieces open into the channels (Ca1, Ca2). These channels are, in this example, optical conduits, preferably integral with the light guide (and therefore tending to be made of polymer material). They can also be optical guides made of solid glass. They can also be fiber optics which convey the light originating from one or more light sources symbolized in the figures by the letter S (halogen bulb or light-emitting diode-type sources, for example). These end pieces are an integral part of the guide G: they are molded in one piece and made, for example, of polycarbonate (other polymers are also appropriate, such as methyl polymethacrylate).

Two bends C1, C2 are provided, so the light beams arriving through the end pieces E1, E2 substantially perpendicularly or obliquely to the median plane of the guide P are diverted respectively on one side and the opposing side of the guide.

Figure 2B:
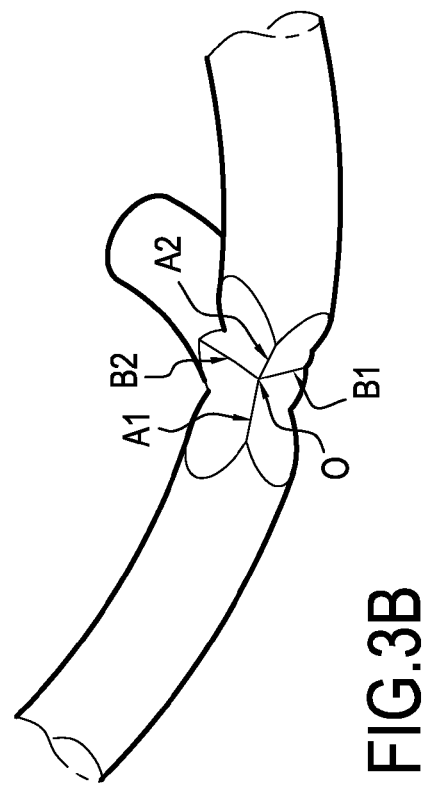
FIGS. 2A and 2B are detailed views of the first example of the light guide according to FIG. 1 in the region of the points for the injection of light into the guide.
Figure 2A:
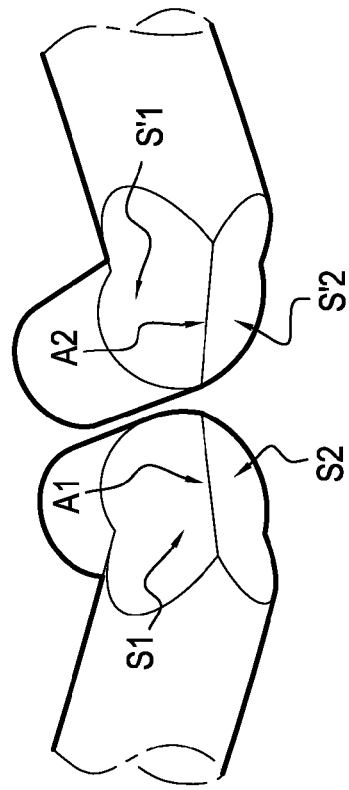

FIGS. 2A and 2B provide two detailed views of FIGS. 1A and 1B in two different perspectives of the zone for connection between the end pieces (which conduct light without re-emitting it) and the guide (which conducts light and which defuses it gradually over the entire length thereof in order to perform its signalling function); there is provided in this case, according to the invention, an approximately 90° bend having a bevelled protruding corner with two facets S1, S2 defining a common ridge A1, A2. There will be noted the difference in configuration of this example to FIG. 6 which represents the prior art for the same type of optical guide with, in the region of the bend, a single inclined side S3.

As illustrated in FIGS. 4A and 4B, the difference of the invention considerably changes the path of the rays in the region of the bend:—according to the prior art illustrated in FIG. 6 and in FIG. 4A, the rays which reach the inclined side S3 have an angular width provided in a referential (x, y, z). The coordinates of the vector n of the normal to the inclined plane S3 are $(1/\sqrt{2}, -1/\sqrt{2}, 0)$. For an incident ray of the mode of 0°, of coordinates (0, 1, 0), an angle of incidence $\alpha$ of 45° is obtained. However, this value is close to the angle of total reflection for the polymer material used to produce the guide, which is approximately 40°. The result is that, for any incident ray arriving on the surface S3 with a smaller angle, there will be a component of the ray that will not be reflected but will issue from the guide, creating a hot spot and reducing the light output in the remainder of the guide.

In the system according to the invention, as illustrated in FIGS. 2A and 2B and in FIG. 4B, the situation is different: the coordinates of the vector normal to the first facet S1 are $(1/2, -1/2, \pm\sqrt{2}/2)$. The angle of incidence of the mode at 0° of the rays on this facet is then 60°, a value quite different to the angle of 40° referred to hereinbefore. These rays, after this first reflection on S1, reach the second facet S2 with an angle of incidence of 60° again. In this case too, the reflection is total, without leakage of light, and the rays are sent back into the guide with a final direction according to the coordinates (1, 0, 0).

FIG. 5A shows in its table, for the example according to the invention: "Example 1" and for the prior art of the figures "Prior art":

the maximum of light measured in candelas (cd), the light flux measured in lumens in the region of the bend.

The measurements are taken in the region of the bend (hot spot) and at a location of the guide remote from the bend on its output face ("ring").

FIG. 5B shows a table derived from the preceding table in order to calculate the differences in maximum and in light flux between the example of the invention and the prior art: the invention therefore allows the loss of light issuing through the hot spot to be reduced by 72% and this light flux emitted by the remainder of the guide simultaneously to be increased by 34%: it will be noted that the invention allows the hot spot impression to be almost eliminated and, furthermore, the guide lights more effectively and more strongly outside of its injection point or points.

Another advantage that Example 1 has over the prior art is that, in the vicinity of the hot spot, the guide, when switched on, has a more uniform appearance than in the prior art.

Figure 3B:
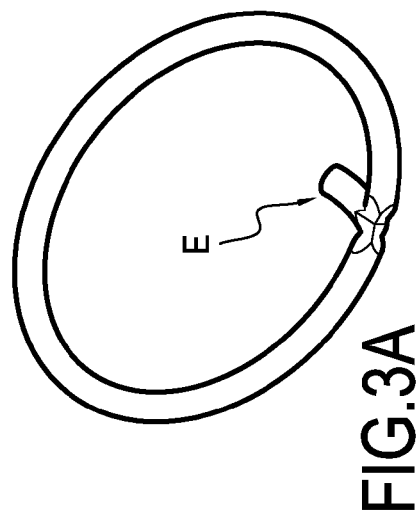
FIGS. 3A and 3B are detailed views of a second example of a light guide in the region of its point for the injection of light into the guide.
Figure 3A:
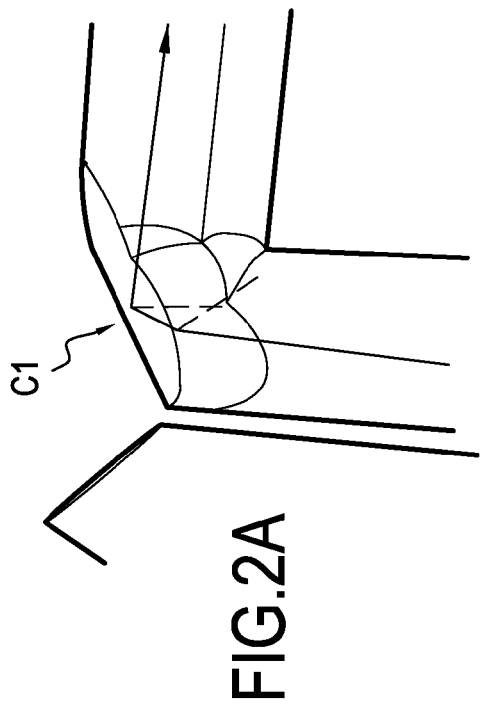

An Example 2 according to the invention is shown in FIGS. 3A and 3B: this is a variation of Example 1. The difference to Example 1 is that, in this case, the guide is not an annular guide having a closed contour. There is only a single end piece E. There are again the two bevelled protruding corners but in this case they intersect, thus providing ridges A1 and A2 of each of the protruding corners (S1, S2) and (S1', S2') as previously. There are also ridges B1, B2 delimiting the intersection of the two corners: B1 between the two first facets (S1, S'1) and B2 between the two second facets (S2, S'2). All of these ridges join in the region of a point of intersection 0. The path of the rays will not be redescribed for this example, given that the rays will similarly undergo a double total reflection.

Obviously, the optical guide according to the invention may have other forms such as, for example, comprising curves, one or more arc-of-a-circle portions, etc. The invention applies, mutatis mutandis, to any closed or open, curved or rectilinear guide and to any bend in the guide, whether it be close to one of its ends, close to its light injection point or otherwise.

In the preceding examples, the optical guide G has a circular cross section; obviously, in other embodiments, it may also have an elliptical, square, oval or even a more complex cross section, and it is based on, preferably crystal-quality, transparent polymer made of polycarbonate (or methyl polymethacrylate PMMA or any other appropriate polymer).

While the form of apparatuses herein described constitutes a preferred embodiments of this invention, it is to be understood that the invention is not limited to these precise forms of apparatuses, and that changes may be made therein without departing from the scope of the invention which is defined in the appended claims.

What is claimed is:

1. A lighting and/or signalling device, in particular for a motor vehicle, comprising at least one light source emitting light rays and at least one optical guide in which said light rays spread, said at least one optical guide comprising:
    at least one end of said at least one optical guide comprising an input face coupling said at least one optical guide and said at least one light source,
    a first surface forming an output face for the light rays, and
    a second surface forming a face for reflection of the light rays,
    wherein said at least one optical guide has at least one bend, said at least one optical guide in the region of said at least one bend having at least one corner protruding toward the outside of said at least one bend; said second surface having at least two facets that cooperate to define a bevel that sends back incident light rays into said at least one optical guide.

2. A lighting and/or signalling device, in particular for a motor vehicle, comprising at least one light source emitting light rays and at least one optical guide in which said light rays spread, said at least one optical guide comprising:
    at least one end of said at least one optical guide comprising an input face coupling said at least one optical guide and said at least one light source,
    a first surface forming an output face for the light rays, and
    a second surface forming a face for reflection of the light rays,
    wherein said at least one optical guide has at least one bend, said at least one optical guide in the region of said at least one bend having at least one corner protruding toward the outside of said at least one bend and bevelled by having two facets in order to send back the incident light rays into said at least one optical guide,
    wherein the protruding corner is designed so as to cause two reflections successively onto one then the other of the facets under conditions for total reflection of the incident light rays.

3. The lighting and/or signalling device according to claim 1, wherein said at least one bend is located in proximity to the input face or to at least one of the input faces of said at least one optical guide.

4. A lighting and/or signalling device, in particular for a motor vehicle, comprising at least one light source emitting light rays and at least one optical guide in which said light rays spread, said at least one optical guide comprising:
    at least one end of said at least one optical guide comprising an input face coupling said at least one optical guide and said at least one light source,
    a first surface forming an output face for the light rays, and
    a second surface forming a face for reflection of the light rays,
    wherein said at least one optical guide has at least one bend, said at least one optical guide in the region of said at least one bend having at least one corner protruding toward the outside of said at least one bend and bevelled by having two facets in order to send back the incident rays into said at least one optical guide,
    wherein said at least one optical guide has an almost closed contour, with the two input faces arranged in proximity to each other.

5. The lighting and/or signalling device according to claim 1, wherein said at least one optical guide has a completely closed contour, with a single input face.

6. The lighting and/or signalling device according to claim 5, wherein said single input face is on a light conveying end piece so that the light rays spreading into the light conveying end piece are then distributed in the region of a zone for connection of said at least one optical guide to the end piece in two streams issuing into said at least one optical guide in differing directions.

7. The lighting and/or signalling device according to claim 6, wherein there are two bends in the region of said zone for connection of said at least one optical guide to the end piece, the bends being joined and their protruding corners partially intersecting.

8. The lighting and/or signalling device according to claim 1, wherein said input face or each of the input faces is on a light conveying end piece.

9. The lighting and/or signalling device according to claim 8, wherein the end piece or pieces is/are an integral part of the optical guide.

10. The lighting and/or signalling device according to claim 8, wherein said at least one bend provided with the protruding corner is arranged in the zone for connection of said at least one optical guide to the end piece.

11. A lighting and/or signalling device for a motor vehicle, comprising at least one light source emitting light rays and at least one optical guide, said at least one optical guide comprising:
an input face at an end for receiving light rays from said at least one optical guide,
a first surface forming an output face for said light rays, and
a second surface remote from the output face, forming a face for reflection of the light rays,
wherein said at least one optical guide has at least one bend, said at least one optical guide in the region of said at least one bend having at least one area for returning incident light rays into said at least one optical guide, wherein said at least one area comprises at least two facets for directing incident light rays into said at least one optical guide.

12. A lighting and/or signalling device for a motor vehicle, comprising at least one light source emitting light rays and at least one optical guide, said at least one optical guide comprising:
an input face at an end for receiving light rays from said at least one optical guide;
a first surface forming an output face for said light rays; and
a second surface remote from the output face, forming a face for reflection of the light rays;
wherein said at least one optical guide has at least one bend, said at least one optical guide in the region of said at least one bend having at least one area for returning incident light rays into said at least one optical guide,
wherein said at least one area comprises a protruding corner adapted to cause two reflections successively onto facets associated with said at least one bend under conditions for total reflection of the incident light rays.

13. The lighting and/or signalling device according to claim 12, wherein said at least one bend is located in proximity to the input face or to at least one of the input faces of said at least one optical guide.

14. A lighting and/or signalling device for a motor vehicle, comprising at least one light source emitting light rays and at least one optical guide, said at least one optical guide comprising:
an input face at an end for receiving light rays from said at least one optical guide;
a first surface forming an output face for said light rays; and
a second surface remote from the output face, forming a face for reflection of the light rays;
wherein said at least one optical guide has at least one bend, said at least one optical guide in the region of said at least one bend having at least one area for returning incident rays into said at least one optical guide,
wherein said at least one optical guide has an almost closed contour, with two input faces arranged in proximity to each other.

15. The lighting and/or signalling device according to claim 11, wherein said at least one optical guide has a completely closed contour, with a single input face.

16. The lighting and/or signalling device according to claim 15, wherein said single input face is on a light conveying end piece so that the light rays are distributed in a zone for connection of said at least one optical guide to the end piece in two streams issuing into said at least one optical guide in differing directions.

17. The lighting and/or signalling device according to claim 16, wherein there are two bends in the region of said zone for connection of said at least one optical guide to the end piece, the bends being joined and their protruding corners partially intersecting.

18. The lighting and/or signalling device according to claim 11, wherein said input face or each of the input faces is on a light conveying end piece.

19. The lighting and/or signalling device according to claim 18, wherein the end piece or pieces is/are an integral part of the optical guide.

20. The lighting and/or signalling device according to claim 18, wherein said at least one bend provided with the protruding corner is arranged in the zone for connection of said at least one optical guide to the end piece.

* * * * *